Patented Jan. 30, 1923.

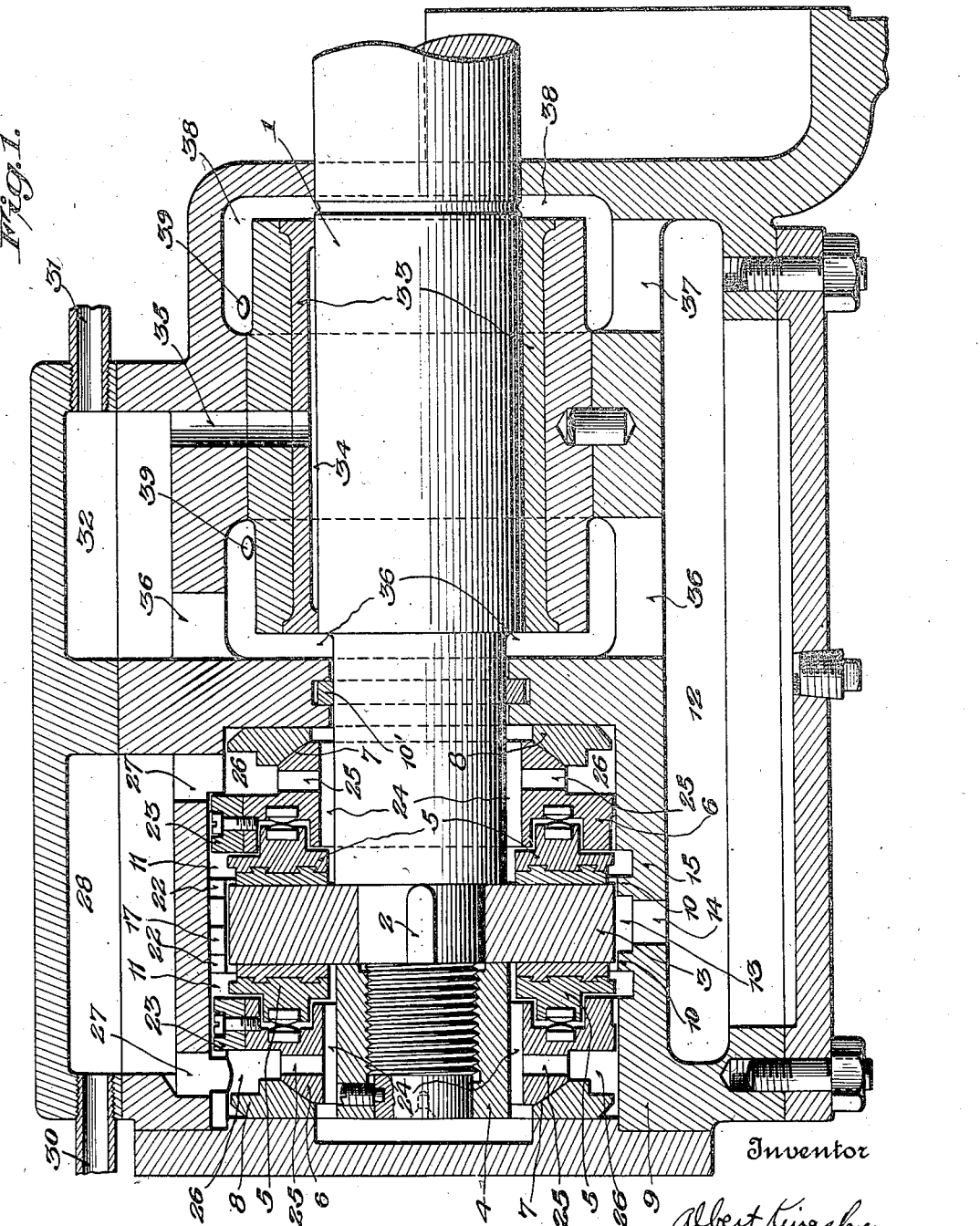

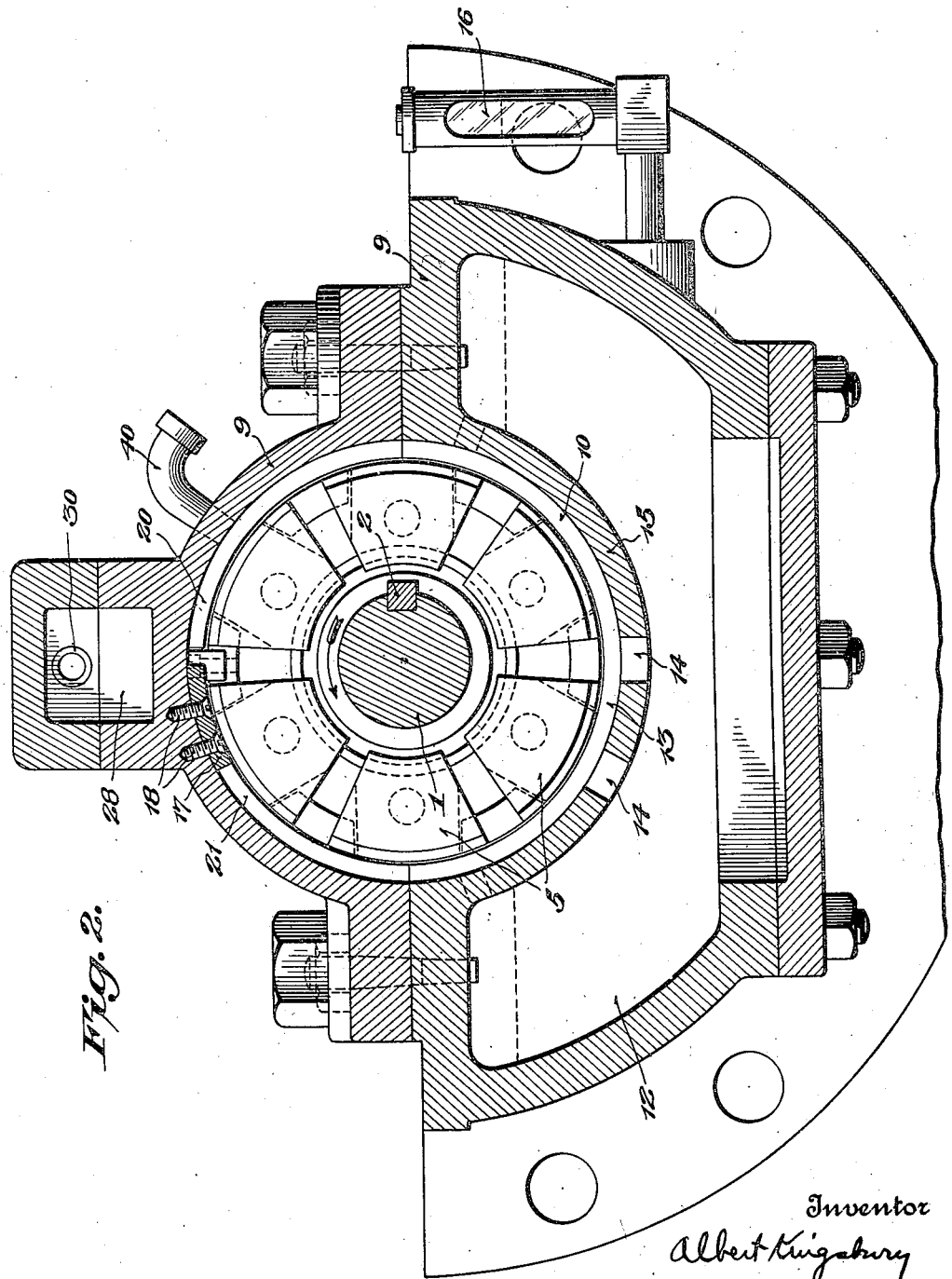

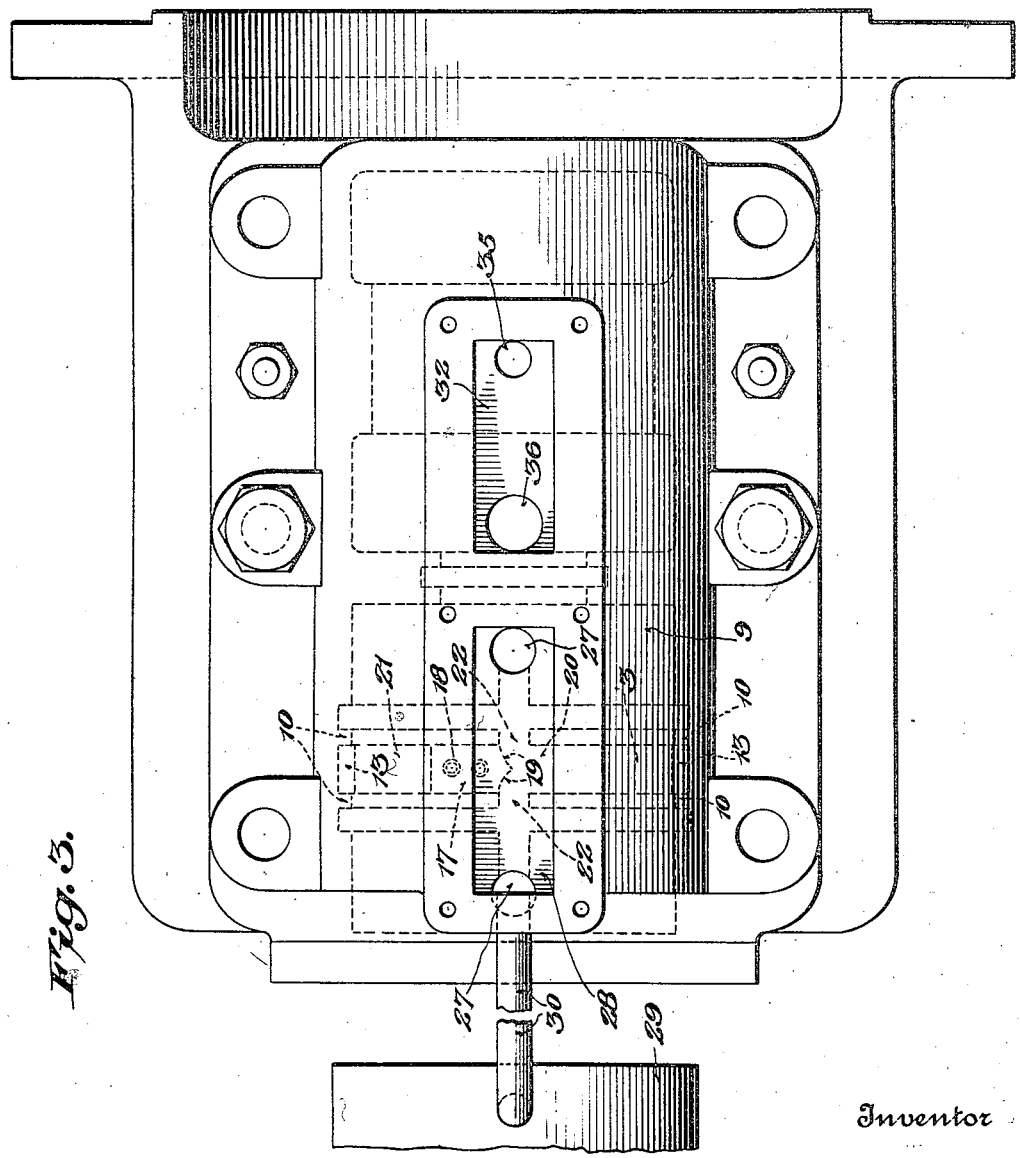

1,443,879

UNITED STATES PATENT OFFICE.

ALBERT KINGSBURY, OF GREENWICH, CONNECTICUT.

HORIZONTAL THRUST BEARING.

Application filed October 11, 1920. Serial No. 416,186.

*To all whom it may concern:*

Be it known that I, ALBERT KINGSBURY, a citizen of the United States, and a resident of Greenwich, Connecticut, have invented new and useful Improvements in Horizontal Thrust Bearings, which invention is fully set forth in the following specification.

This invention relates to bearings for horizontal or inclined shafts, especially thrust bearings for such shafts, and, more particularly, to means for maintaining a flow of lubricating oil through the bearing and also, preferably, through means for extracting heat from said oil.

I have heretofore proposed, in my application Sr. No. 264,287, filed Nov. 27, 1918, to provide a bearing for horizontal or inclined shafts with one or more oil-retaining chambers in which the bearing members are disposed and to maintain said bearing members immersed in oil when the bearing is in operation by keeping said chamber or chambers full of oil which is directed into said chamber or chambers by oil-collecting means cooperating with a rotatable oil-carrying surface. In order that the shaft may rotate in either direction, said oil-collecting means is constructed and arranged to collect oil from said oil-carrying surface and direct it into said chamber or chambers for both directions of rotation of said oil-carrying surface. As the outlet of each of said chambers is in communication with the oil reservoir through the space around the oil-carrying surface at the rear of the oil-collecting means, the pressure on the oil at said outlet is substantially the same as that on the oil in the oil reservoir. In other words, the oil in each of said oil-retaining chambers is under substantially atmospheric pressure, so that the return of said oil to the oil reservoir is effected only by the action of gravity on the overflow from said chamber or chambers.

It is an object of this invention to provide a thrust bearing with one or more oil-retaining chambers and means for collecting oil from a rotatable oil-carrying surface so related thereto that a pressure above atmospheric is maintained on the oil in said chamber or chambers, so that a more rapid circulation of the oil is effected by the pressure to which it is subjected.

Another object of this invention is to provide a bearing with one or more oil-retaining chambers and means for collecting oil from a rotatable oil-carrying surface so related thereto that the oil in said chamber or chambers is maintained under a pressure whereby said oil may be caused to flow from said chamber or chambers to an oil-cooling device which is exterior of the oil reservoir.

Another object of this invention is to provide a thrust bearing with one or more oil-retaining chambers and means for collecting oil from a rotatable oil-carrying surface so related thereto that the oil in said chamber or chambers is maintained under a pressure whereby said oil may be caused to flow to one or more guide bearings.

Another object of this invention is to provide a bearing with oil-circulating means which is simple in construction and efficient in operation, and which enables a compact and simple cooling device to be employed exteriorly of the oil reservoir without the use of an oil-circulating pump.

Stated broadly, the invention comprises a bearing for horizontal or inclined shafts having relatively rotatable bearing members, a housing for said bearing including one or more oil-retaining chambers, a rotatable oil-carrying surface, and means co-operating with said oil-carrying surface to collect oil therefrom and direct it into said chamber or chambers, said oil-collecting means being so related to said parts that the oil in said chamber or chambers is maintained under pressure. This pressure under which the oil in the oil-retaining chamber or chambers is maintained may be utilized in causing a flow of the oil to an oil-cooling device, or to a guide bearing, or to both.

The invention is capable of receiving a variety of mechanical expressions, one of which is shown on the accompanying drawings, but it is to be expressly understood that the drawings are for purposes of illustration only and are not to be construed as a definition of the limits of the invention, reference being had to the appended claims for that purpose.

In said drawings, wherein the same reference characters are employed to designate corresponding parts in the several figures, Fig. 1 is an axial section of a horizontal thrust bearing embodying the present invention;

Fig. 2 is a transverse section of said bearing with the thrust collar removed; and Fig. 3 is a plan of the bearing housing.

In the form shown, 1 is a horizontal shaft on which is mounted in any suitable way, as by the key 2, a thrust collar 3 of any suitable construction. Said thrust collar may be retained on said shaft 1 in any suitable way, as by a ring nut 4. Cooperating with one or both of the faces of the thrust collar 3 are thrust bearing members of any suitable construction. The bearing illustrated is adapted to take thrust in both directions and is therefore provided with thrust bearing members cooperating with both faces of said thrust collar; it is to be expressly understood, however, that if the bearing is to take thrust in one direction only, the thrust bearing member or members will be arranged for cooperation with only one of the faces of said collar. In the form shown, the thrust bearing members are composed of a plurality of bearing segments or shoes 5 mounted to tilt, preferably both radially and circumferentially of the bearing, in any suitable way on equalizing means of any suitable construction, shown as an equalizing ring 6 provided with a spherical surface 7 for engagement with the opposed spherical surface of a base ring 8. It is to be expressly understood, however, that any other suitable construction and arrangement of thrust bearing members and equalizing means may be employed, if desired.

Surrounding the thrust bearing thus provided is a housing 9 of any suitable construction but which is so formed and arranged with respect to the bearing parts as to provide oil-retaining chambers in which the bearing members are disposed. In the form shown, the housing is provided with annular ribs 10 which closely embrace the periphery of the thrust collar 3 so as to separate the space surrounding the periphery of the collar from the space or spaces in which said bearing members are disposed. Therefore, said annular ribs 10 cooperate with the thrust collar 3 to provide an oil-retaining chamber 11 on each side of said collar. It is to be expressly understood, however, that any other suitable construction or arrangement of parts may be employed to separate the space surrounding the periphery of the thrust collar from the space or spaces in which the bearing members are disposed:—thus wiper rings on either the thrust collar or the housing may engage the other of said parts to provide said oil-retaining chambers. The opposite ends of said chambers may be closed in any suitable way. In the form shown, the left hand chamber 11 is completed by the end wall of the housing while the right hand chamber 11 is completed by a wiper ring 10' between the casing wall and the shaft 1.

The bottom portion of said housing 9 is shown as formed to provide a chamber 12 which constitutes an oil reservoir, and said housing with its inner wall 15 closely embraces the periphery of the thrust collar as shown in Fig. 2 so as to provide a radially-narrow annular chamber 13 surrounding said periphery. Said oil reservoir is in communication with the space 13 surrounding the periphery of the thrust collar 3 through one or more apertures 14 provided in the cylindrical enclosing wall 15. The oil is maintained in said reservoir at such a level, as indicated by the dotted line in Fig. 2, that it flows into the space 13 through the aperture or apertures 14 and wets the lower portion of the thrust collar 3, but is preferably maintained at a level below that of the underside of the shaft. An oil gage, as illustrated at 16, may be provided to indicate the height of the oil in said reservoir. The thrust collar 3 therefore extends or dips into the oil, and the peripheral surface of said collar constitutes an oil-carrying surface by which oil is carried upwardly from the oil reservoir to the top of the bearing.

Means are provided for collecting oil from said rotatable oil-carrying surface of the thrust collar and directing it into the oil-retaining chamber or chambers 11. Said oil-collecting means may be of any suitable construction and may be mounted either on the housing or on the thrust collar. In the form shown, an oil collector and deflector 17 is mounted in any suitable way on the housing 9, as by the screws 18. When bearing members are provided for cooperation with both faces of said thrust collar, said oil collector is so constructed as to direct oil into both of the chambers 11 and, therefore, is provided with two oil-deflecting edges 19, as shown more clearly in dotted line in Fig. 3. Said oil collector is so constructed and arranged with respect to the housing and the adjacent bearing parts as to constitute a barrier or partition in the space 13 surrounding the periphery of the thrust collar, so as to divide said space into two parts or chambers 20 and 21, (see Fig. 2) the former of which is at the forward or oil-collecting side of said collector and the latter of which is at the rear of said oil collector. The inlets of the chamber or chambers 11 are provided by interruptions 22 in the annular ribs 10 and these inlets communicate only with the space or chamber 20 at the forward or oil-collecting side of the oil-collecting means.

The oil directed into the chamber or chambers 11 may be caused to flow directly into contact with the thrust bearing surfaces or it may be caused to flow to the rear of the thrust bearing members and then around said members into contact with said thrust bearing surfaces. In the form shown, each equalizing ring 6 with its key 23 is so constructed and arranged as to divide each of said chambers 11 into two compartments. The oil directed into each of said chambers 11 by the oil-collecting means 17 flows radially inward between the bearing segments or shoes 5, thence axially along the shaft through the passage or passages 24 provided between said shaft and the equalizing ring 6, thence radially outward through a passage or passages 25 in said equalizing ring into the annular space 26 between said equalizing ring and the base ring 8. From each annular space 26 the oil flows through one or more apertures 27 in the housing wall to a chamber 28 suitably provided in the housing 9.

As the oil-retaining chambers 11 are in communication with the space 13 around the periphery of the thrust collar at only the forward or oil-collecting side of the oil-collecting means 17, the pressure developed in the oil by the pumping action of the rotatable thrust collar is maintained on the oil in said chambers 11, and this pressure may be utilized for causing a more rapid circulation of the oil through said chambers, or said pressure may be utilized for causing the oil to flow to an oil-cooling device, or one or more guide bearings, or both. In the form shown, a cooling device is diagrammatically illustrated at 29, and its inlet communicates though the conduit 30 with the chamber 28, while its outlet communicates through the conduit 31 with a second chamber 32 also suitably provided in the housing 9. From the latter chamber the oil may be returned directly to the oil reservoir 12, or as in the form shown, the circulating oil may also be made to properly lubricate one or more guide bearings. Referring to Fig. 1, the shaft 1 is shown as provided with a guide bearing 33 in the upper portion of which is a longitudinal oil groove 34 extending substantially throughout the length of said bearing, and said oil groove 34 communicates with the chamber 32 through a passage 35 suitably formed in the housing 9. As the oil circulated through the cooling device by the pressure in the oil-retaining chamber or chambers will normally be in excess of that required for the lubrication of the guide bearing, a passage 36 is also preferably provided in the housing 9 for returning oil from the chamber 32 directly to the oil reservoir 12.
The oil which passes through the guide bearing is also returned to the oil reservoir 12, the oil being returned in the structure illustrated through said passage 36 and a second passage 37 communicating with an annular chamber 38 provided around the outer end of the guide bearing. The passages 36 and 35 are so proportioned as to provide a proper supply of oil to the guide bearing. The chambers around the guide bearing may be suitably vented, as by vent pipes 39, and one or more suitable vent pipes 40 communicate with the oil-retaining chambers 11 to permit the escape of air as said chambers are being filled with oil when rotation of the shaft is commenced.

In operation, the rotating thrust collar extends or dips into the oil which flows into the chamber 13 from the oil reservoir 12 and said oil is carried upwardly by the periphery of said collar which constitutes an oil-carrying surface. From said oil-carrying surface the oil is collected and directed by the oil-collecting means 17 so that it flows into and fills the oil-retaining chamber or chambers 11. When said chamber or chambers are filled with oil, the pressure, which is developed by the pumping action of the rotating thrust collar and which is maintained on the oil in each of said chambers owing to the construction and arrangement of the oil-collecting means with respect to said chamber or chambers, is sufficient to cause a circulation of the oil through each chamber 11 and to and through the oil-cooling device 29, whence it returns to the chamber 32. From the latter chamber the flow is divided, part going to lubricate the journal bearing 33 and part returning directly through the passage 36 to the oil reservoir 12. While the oil flowing from both chambers 11 is shown as united in the chamber 28, whence it flows to the oil-cooling device 29, it is to be understood that the two streams may be kept separate if desired and conducted to separate oil-cooling devices, or separate guide bearings, or both.

It will thus be perceived that a bearing has been provided with an oil-retaining chamber or chambers and oil-collecting means which is so related thereto that a pressure is maintained on the oil in said chamber or chambers so as to cause a more rapid circulation of oil through said chamber or chambers and also a circulation through a cooling device, or a guide bearing, or both, without the use of external pumping means.

While the embodiment of the invention illustrated on the drawings has been described with considerable particularity, it is to be expressly understood that the invention is not restricted thereto, as the same is capable of receiving a variety of mechanical expressions. Certain features of the invention may be used without other features thereof, and changes may be made in the details of construction, proportion and arrangement of parts without departing from the spirit of this invention. Reference is therefore to be had to the claims hereto appended for a definition of the limits of said invention. In said claims the term "horizontal" is to be understood as generic to bearings for shafts having a suitable inclination to the horizontal.

What is claimed is:

1. A horizontal thrust bearing comprising relatively rotatable bearing members, a housing for said bearing including an oil-retaining chamber in which said bearing members are disposed, a rotatable oil-carrying surface, and means for collecting oil from said surface and directing it to said chamber, the inlet of said chamber communicating only with the space at the forward side of said oil-collecting means whereby a pressure is maintained on the oil in said chamber.

2. A horizontal thrust bearing comprising relatively rotatable bearing members, a housing for said bearing including an oil-retaining chamber in which said bearing members are disposed, a rotatable oil-carrying surface, and means for collecting oil from said surface and directing it to said chamber, said oil-collecting means being so constructed and arranged with respect to said chamber that a pressure is maintained on the oil in said chamber when the bearing is in operation.

3. A horizontal thrust bearing comprising a rotatable thrust collar, a bearing member cooperating with a face of said collar, a housing for said bearing including an oil-retaining chamber in which said bearing member is disposed, an oil reservoir into which said collar extends, and means for collecting oil from the surface of said collar and directing it into said chamber, said oil-collecting means providing a barrier across the oil-carrying surface of said collar and the inlet of said chamber communicating only with the space at the forward side of said barrier.

4. A horizontal thrust bearing comprising a rotatable thrust collar, a bearing member cooperating with a face of said collar, a housing for said bearing including an oil-retaining chamber in which said bearing member is disposed, an oil reservoir into which said collar extends, and means for collecting oil from the surface of said collar and directing it into said chamber, said oil-collecting means being so related to said chamber that said rotatable collar cooperates with said oil-collecting means to maintain a pressure on the oil in said chamber when the bearing is in operation.

5. A horizontal thrust bearing comprising a rotatable thrust collar, a bearing member cooperating with a face of said collar, a housing forming with said collar an oil-retaining chamber in which said bearing member is disposed, and means for collecting oil from an oil-carrying surface of said collar and directing it into said chamber, the inlet of said chamber communicating only with the oil-collecting side of said oil collecting means whereby a pressure is maintained on the oil in said chamber.

6. A horizontal thrust bearing comprising a rotatable thrust collar, a bearing member cooperating with a face of said collar, a housing forming with said collar an oil-retaining chamber in which said bearing member is disposed, and oil-collecting means dividing the space around the periphery of said collar into two chambers, said oil-retaining chamber having its inlet communicating only with the chamber on the oil-collecting side of said oil-collecting means.

7. A horizontal thrust bearing comprising a rotatable thrust collar, a bearing member cooperating with a face of said collar, a housing forming with said collar an oil-retaining chamber in which said bearing member is disposed, an oil reservoir into which said collar dips, and oil-collecting means cooperating with said collar to direct oil into said chamber, said chamber having its inlet in communication only with the space at the forward side of said oil-collecting means.

8. A horizontal thrust bearing comprising a rotatable thrust collar, bearing members cooperating with the opposed faces of said collar, a housing for said bearing including oil-retaining chambers on both sides of said collar in which said bearing members are disposed, and oil-collecting means cooperating with an oil-carrying surface of said collar to direct oil into both of said chambers, the inlets of said chambers communicating only with the space at the forward side of said oil-collecting means.

9. A horizontal thrust bearing comprising a rotatable thrust collar, bearing members cooperating with the opposed faces of said collar, a housing for said bearing including oil-retaining chambers on both sides of said collar in which said bearing members are disposed, and oil-collecting means cooperating with an oil-carrying surface of said collar to direct oil into both of said chambers, said oil-collecting means being so constructed and arranged with respect to said chambers that a pressure is maintained on the oil in both of said chambers when the bearing is in operation.

10. A horizontal thrust bearing comprising a rotatable thrust collar, bearing members cooperating with the opposed faces of said collar, a housing for said bearing forming with said collar two oil-retaining chambers in which said bearing members are disposed, an oil reservoir into which said collar extends, and oil-collecting means cooperating with the oil-carrying surface of said collar to direct oil into both of said chambers, the inlets of said chambers communicating only with the oil-collecting side of said oil-collecting means.

11. A horizontal thrust bearing comprising a rotatable thrust collar, bearing members cooperating with the opposed faces of said collar, a housing for said bearing including oil-retaining chambers on opposite sides of said collar in which said bearing members are disposed, an oil reservoir into which said collar extends, and oil-collecting means cooperating with the oil-carrying surface of said collar to direct oil into both of said chambers, said oil-collecting means cooperating with adjacent parts to provide a barrier across the space in which said collar rotates and the inlets of said chambers communicating only with the space at the forward side of said barrier.

12. A bearing comprising relatively rotatable bearing members, a housing for said bearing including an oil-retaining chamber in which said bearing members are disposed, a rotatable oil-carrying surface, oil-collecting means cooperating with said oil-carrying surface to direct oil into said chamber and so related thereto that a pressure is maintained on the oil in said chamber when the bearing is in operation, and a separate oil-cooling device communicating with said chamber and through which said oil flows under the pressure in said chamber.

13. A bearing comprising relatively rotatable bearing members, a housing for said bearing including an oil-retaining chamber in which said bearing members are disposed, a rotatable oil-carrying surface, an oil reservoir into which said oil-carrying surface dips, oil-collecting means cooperating with said oil-carrying surface to direct oil into said chamber and so related thereto that a pressure is maintained on the oil in said chamber when the bearing is in operation, and an oil-cooling device, having its inlet communicating with said chamber and its outlet communicating with said oil reservoir, through which said oil circulates under the pressure in said chamber.

14. A horizontal thrust bearing comprising a rotatable thrust collar, a bearing member cooperating with said collar, a housing for said bearing cooperating therewith to provide an oil-retaining chamber in which said bearing member is disposed, an oil reservoir into which said collar extends, an oil-cooling device having its inlet communicating with said chamber and its outlet communicating with said oil reservoir, and oil-collecting means cooperating with the oil-carrying surface of said collar to direct oil into said chamber and so related thereto that a pressure is maintained on the oil in said chamber when the bearing is in operation whereby the oil flows from said chamber through said oil-cooling device.

15. A horizontal thrust bearing comprising a rotatable thrust collar, a bearing member cooperating with said collar, a housing for said bearing cooperating therewith to provide an oil-retaining chamber in which said bearing member is disposed, an oil reservoir into which said collar extends, an oil-cooling device having its inlet communicating with said chamber and its outlet communicating with said oil reservoir, and oil-collecting means cooperating with the oil-carrying surface of said collar to direct oil into said chamber, the inlet of said chamber communicating only with the space at the forward side of said oil-collecting means whereby a pressure is maintained on the oil in said chamber to cause the same to flow therefrom through said cooling device.

16. A horizontal thrust bearing comprising a rotatable thrust collar, bearing members cooperating with the opposed faces of said collar, a housing for said bearing including oil-retaining chambers on both sides of said collar in which said bearing members are disposed, oil-collecting means co-operating with an oil-carrying surface of said collar to direct oil into both of said chambers and so related thereto that a pressure is maintained on the oil in said chamber when the bearing is in operation, and a separate oil-cooling device communicating with both of said chambers and to which said oil flows under the pressure in said chambers.

17. A horizontal thrust bearing comprising a rotatable thrust collar, bearing members cooperating with the opposed faces of said collar, a housing for said bearing including oil-retaining chambers on both sides of said collar in which said bearing members are disposed, an oil reservoir into which said collar dips, oil-collecting means cooperating with the oil-carrying surface of said collar to direct oil into both of said chambers and so related thereto that a pressure is maintained on the oil in said chambers when the bearing is in operation, and oil-cooling means in communication with said chambers and said oil reservoir and through which said oil is circulated by the pressure in said chambers.

18. A horizontal thrust bearing comprising a rotatable thrust collar, bearing members cooperating with the opposed faces of said collar, a housing for said bearing including oil-retaining chambers on both sides of said collar in which said bearing members are disposed, an oil reservoir into which said collar extends, oil-collecting means cooperating with the oil-carrying surface of said collar to direct oil into both of said chambers, and oil-cooling means in communication with said chambers and said reservoir, the inlets of said chambers communicating only with the space at the oil-collecting side of said oil-collecting means whereby a pressure is maintained on the oil in said chambers when the bearing is in operation to circulate the same through said oil-cooling device.

19. A horizontal thrust bearing comprising relatively rotatable bearing members, a housing for said bearing including an oil-retaining chamber in which said bearing members are disposed, a rotatable oil-carrying surface, oil collecting means cooperating with said oil-carrying surface to direct oil into said chamber and so related thereto that a pressure is maintained on the oil in said chamber when the bearing is in operation, and one or more guide bearings to which the oil flows under the pressure in said chamber.

20. A horizontal thrust bearing comprising a rotatable thrust collar, a bearing member cooperating with a face of said collar, a housing for said bearing including an oil-retaining chamber in which said bearing member is disposed, an oil reservoir into which said collar extends, oil-collecting means cooperating with the oil-carrying surface of said collar to direct oil into said chamber and so related thereto that a pressure is maintained on the oil in said chamber when the bearing is in operation, a guide bearing to which the oil flows under the pressure on the oil in said chamber, and a conduit for returning the oil from said guide bearing to said oil reservoir.

21. A horizontal thrust bearing comprising a rotatable thrust collar, a bearing member cooperating with a face of said collar, a housing for said bearing including an oil-retaining chamber in which said bearing member is disposed, an oil reservoir into which said collar extends, oil-collecting means cooperating with the oil-carrying surface of said collar to direct oil into said chamber, the inlet of said chamber communicating only with the space at the forward side of said oil-collecting means, and a guide bearing communicating with the outlet of said chamber.

22. A horizontal thrust bearing comprising a relatively rotatable thrust collar, bearing members cooperating with the opposed faces of said collar, a housing including oil-retaining chambers at both sides of said collar in which said bearing members are disposed, oil-collecting means cooperating with an oil-carrying surface of said thrust collar to direct oil into both of said chambers and so related thereto that a pressure is maintained on the oil in said chambers when the bearing is in operation, and one or more guide bearings to which the oil flows under the pressure in said chambers.

23. A horizontal thrust bearing comprising a relatively rotatable thrust collar, bearing members cooperating with the opposed faces of said collar, a housing including oil-retaining chambers at both sides of said collar in which said bearing members are disposed, an oil reservoir into which said collar extends, oil-collecting means cooperating with the oil-carrying surface of said collar to direct oil into both of said chambers, the inlets of said chambers communicating only with the space at the forward side of said oil-collecting means, and one or more guide bearings communicating with the outlets of said chambers.

24. A horizontal thrust bearing comprising relatively rotatable bearing members, a housing including an oil-retaining chamber in which said bearing members are disposed, an oil-carrying surface, oil-collecting means cooperating with said oil-carrying surface to direct oil into said chamber and so related thereto that a pressure is maintained on the oil in said chamber when the bearing is in operation, an oil-cooling device through which the oil is circulated by the pressure in said chamber, and a guide bearing supplied with lubricant from the circulating oil.

25. A horizontal thrust bearing comprising a rotatable thrust collar, a bearing member cooperating therewith, a housing including an oil-retaining chamber in which said bearing member is disposed, an oil reservoir into which said collar extends, oil-collecting means cooperating with the oil-carrying surface of said collar to direct oil into said chamber and so related thereto that a pressure is maintained on the oil in said chamber when the bearing is in operation, an oil-cooling device communicating with the outlet of said chamber, and a guide bearing having an oil-passage for conveying lubricant thereto communicating with the outlet of said cooling device.

26. A horizontal thrust bearing comprising a rotatable thrust collar, a bearing member cooperating therewith, a housing including an oil-retaining chamber in which said bearing member is disposed, an oil reservoir into which said collar extends, oil collecting means cooperating with the oil-carrying surface of said collar to direct oil into said chamber and so related thereto that a pressure is maintained on the oil in said chamber when the bearing is in operation, an oil-cooling device communicating with the outlet of said chamber, a passage for the return of the oil from said oil-cooling device to said oil reservoir, and a guide bearing having an oil passage communicating with said return passage and through which a part of the oil flows to said guide bearing.

27. A horizontal thrust bearing comprising a rotatable thrust collar, bearing members cooperating with the opposed faces of said collar, a housing including oil-retaining chambers on both sides of said collar in which said bearing members are disposed, an oil reservoir into which said collar extends, oil-collecting means cooperating with the oil carrying surface of said collar to direct oil into both of said chambers and so related thereto that a pressure is maintained on the oil in said chambers when the bearing is in operation, oil-cooling means communicating with the outlets of said chambers, and one or more guide bearings lubricated by the oil returning to said oil reservoir from said oil-cooling means.

28. In a horizontal thrust bearing, the combination of relatively rotatable bearing members, a housing for said bearing including one or more oil-retaining chambers in which said bearing members are disposed, a rotatable oil-carrying surface, and means co-operating with said oil-carrying surface whereby the same operates as a pump to pump oil to said chamber or chambers and maintain a pressure on the oil therein.

29. In a bearing, the combination of relatively rotatable bearing members, a housing for said bearing including one or more oil-retaining chambers in which said bearing members are disposed, a rotatable oil-carrying surface, means cooperating with said oil-carrying surface whereby the same operates as a pump to pump oil to said chamber or chambers and maintain a pressure on the oil therein, and oil-cooling means through which the oil is circulated by the pressure on the oil in said chamber or chambers.

30. In a horizontal thrust bearing, the combination of relatively rotatable bearing members, a housing for said bearing including one or more oil-retaining chambers in which said bearing members are disposed, a rotatable oil-carrying surface, means cooperating with said oil-carrying surface whereby the same operates as a pump to pump oil to said chamber or chambers and maintain a pressure on the oil therein, and one or more guide bearings through which the oil is circulated by the pressure on the oil in said chamber or chambers.

31. In a thrust bearing, a rotatable thrust collar, one or more bearing members co-operating therewith, means for supplying oil to said thrust collar whereby its periphery acts as a pump to pump oil to the bearing surfaces, and means whereby the pressure developed in the oil by said pumping action is maintained in the oil supplied to said bearing surfaces.

32. In a thrust bearing, a rotatable thrust collar, one or more bearing members co-operating therewith, means for supplying oil to said thrust collar whereby its periphery acts as a pump to pump oil to the bearing surfaces, means whereby the pressure developed in the oil by said pumping action is maintained in the oil supplied to said bearing surfaces, and oil-cooling means through which the oil is circulated by the pressure developed in the oil by said pumping action.

33. In a thrust bearing, a rotatable thrust collar, one or more bearing members co-operating therewith, means for supplying oil to said thrust collar whereby its periphery acts as a pump to pump oil to the bearing surfaces, means whereby the pressure developed in the oil by said pumping action is maintained in the oil supplied to said bearing surfaces, and one or more journal bearings through which the oil is circulated by the pressure developed in the oil by said pumping action.

34. A horizontal thrust bearing comprising relatively rotatable bearing members, a housing for said bearing including one or more oil-retaining chambers in which said bearing members are disposed, a rotatable oil-carrying surface, and oil collecting means for directing oil from said surface into said chamber or chambers and dividing the space around the said surface into two chambers, said oil-retaining chamber or chambers having inlet communication with only the chamber on the oil-collecting side of said oil-collecting means.

35. A bearing comprising relatively rotatable bearing members, a housing for said bearing including one or more oil-retaining chambers in which said bearing members are disposed, a rotatable oil-carrying surface, oil collecting means for directing oil from said surface into said chamber or chambers, said chamber or chambers having inlet communication with only the space at the oil-collecting side of said oil-collecting means, and an oil-cooling device communicating with said chamber or chambers and through which the oil is circulated by the pressure on the oil in said chamber or chambers.

36. A horizontal thrust bearing comprising relatively rotatable bearing members, a housing for said bearing including one or more oil-retaining chambers in which said bearing members are disposed, a rotatable oil-carrying surface, oil-collecting means for directing oil from said surface into said chamber or chambers, said chamber or chambers having inlet communication with only the space at the oil-collecting side of said oil-collecting means, and one or more guide bearings through which the oil is circulated by the pressure on the oil in said chamber or chambers.

In testimony whereof I have signed this specification.

ALBERT KINGSBURY.